United States Patent
Yi et al.

(10) Patent No.: US 9,445,378 B2
(45) Date of Patent: Sep. 13, 2016

(54) METHOD AND APPARATUS FOR COVERAGE ENHANCEMENT

(71) Applicant: LG ELECTRONICS INC., Seoul (KR)

(72) Inventors: Yunjung Yi, Seoul (KR); Joonkui Ahn, Seoul (KR); Suckchel Yang, Seoul (KR); Hyangsun You, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/903,008

(22) PCT Filed: Jul. 25, 2014

(86) PCT No.: PCT/KR2014/006848
§ 371 (c)(1),
(2) Date: Jan. 5, 2016

(87) PCT Pub. No.: WO2015/012654
PCT Pub. Date: Jan. 29, 2015

(65) Prior Publication Data
US 2016/0142981 A1 May 19, 2016

Related U.S. Application Data

(60) Provisional application No. 61/858,118, filed on Jul. 25, 2013, provisional application No. 61/862,068, filed on Aug. 4, 2013, provisional application No. 61/897,177, filed on Oct. 29, 2013, provisional application No. 61/912,025, filed on Dec. 5, 2013, provisional application No. 61/930,413, filed on Jan. 22, 2014.

(51) Int. Cl.
*H04W 36/00* (2009.01)
*H04W 52/24* (2009.01)
(Continued)

(52) U.S. Cl.
CPC ............ *H04W 52/245* (2013.01); *H04W 48/16* (2013.01); *H04W 52/242* (2013.01); *H04W 52/322* (2013.01)

(58) Field of Classification Search
None
See application file for complete search history.

(56) References Cited

U.S. PATENT DOCUMENTS

| | | | |
|---|---|---|---|
| 7,979,769 B2* | 7/2011 | Chun | H04L 1/1822 370/474 |
| 8,254,316 B2* | 8/2012 | Chen | H04W 74/002 370/328 |

(Continued)

FOREIGN PATENT DOCUMENTS

| | | |
|---|---|---|
| KR | 10-2012-0006572 A | 1/2012 |
| WO | WO 2010/129933 A1 | 11/2010 |

OTHER PUBLICATIONS

Ericsson et al. "Coverage enhancements for MTC-conclusions and recommendations", R1-132021, 3GPP TSG-RAN WG1 Meeting #73, Fukuoka, Japan, May 20-24, 2013, see pp. 1-2.

(Continued)

*Primary Examiner* — Dominic Rego
(74) *Attorney, Agent, or Firm* — Birch, Stewart, Kolasch & Birch, LLP

(57) ABSTRACT

The present invention is method and apparatus for coverage enhancement. An embodiment of the present invention includes detecting a cell with primary synchronization signal (PSS) and/or secondary synchronization signal (SSS), detecting reference signal based on the detected synchronization signal, detecting broadcasting channel based on the detected reference signal and decoding master information block on the broadcasting channel, detecting system information block on a downlink data channel, transmitting random access preamble on random access channel based on a system information obtained from the system information block and receiving random access response corresponding to the random access preamble.

13 Claims, 8 Drawing Sheets

(51) Int. Cl.
*H04W 48/16* (2009.01)
*H04W 52/32* (2009.01)

(56) References Cited

U.S. PATENT DOCUMENTS

| | | | | |
|---|---|---|---|---|
| 8,305,970 B2 * | 11/2012 | Park | .................. | H04L 1/0026 370/329 |
| 8,615,002 B2 * | 12/2013 | Pelletier | ................ | H04W 52/50 370/311 |
| 2006/0209767 A1 * | 9/2006 | Chae | .................. | H04W 28/08 370/335 |
| 2007/0189234 A1 * | 8/2007 | Heo | .................. | H04W 52/10 370/335 |
| 2008/0260000 A1 | 10/2008 | Periyalwar et al. | | |
| 2009/0305693 A1 * | 12/2009 | Shimomura | ........ | H04W 74/004 455/422.1 |
| 2011/0039552 A1 * | 2/2011 | Narasimha | .......... | H04W 76/028 455/425 |
| 2011/0081927 A1 | 4/2011 | Gerstenberger et al. | | |
| 2011/0317742 A1 * | 12/2011 | Kawahatsu | ........... | H04L 1/0003 375/132 |
| 2012/0028630 A1 * | 2/2012 | Yamamoto | .......... | H04W 52/242 455/422.1 |
| 2012/0214538 A1 * | 8/2012 | Kim | .................. | H04W 52/50 455/522 |
| 2012/0281629 A1 * | 11/2012 | Zhou | .................... | H04J 11/0073 370/328 |
| 2013/0195069 A1 * | 8/2013 | Frederiksen | .......... | H04W 48/12 370/330 |
| 2013/0259009 A1 * | 10/2013 | Berggren | .......... | H04W 72/0446 370/336 |
| 2013/0272158 A1 * | 10/2013 | Park | .................... | H04W 52/242 370/252 |
| 2013/0324182 A1 * | 12/2013 | Deng | .................. | H04W 52/281 455/522 |
| 2014/0286219 A1 * | 9/2014 | Siomina | ............... | H04J 11/0023 370/311 |
| 2014/0334318 A1 * | 11/2014 | Pica | .................... | H04W 36/14 370/252 |
| 2015/0245378 A1 * | 8/2015 | Kim | .................... | H04W 74/006 370/329 |
| 2016/0029364 A1 * | 1/2016 | Dinan | ............... | H04W 56/0005 370/336 |

OTHER PUBLICATIONS

LG Electronics, "Discussion on coverage enhancement of SIB and RRC signaling", R1-132233, 3GPP TSG RAN WG1 Meeting #73, Fukuoka, Japan, May 20-24, 2013, see pp. 1-3.

* cited by examiner

METHOD AND APPARATUS FOR COVERAGE ENHANCEMENT

CROSS REFERENCE TO RELATED APPLICATIONS

This application is the National Phase of PCT International Application No. PCT/KR2014/006848, filed on Jul. 25, 2014, which claims priority under 35 U.S.C. 119(e) to U.S. Provisional Application Nos. 61/858,118 filed on Jul. 25, 2013, 61/862,068 filed on Aug. 4, 2013, 61/897,177 filed on Oct. 29, 2013, 61/912,025 filed on Dec. 5, 2013, and 61/930,413 filed on Jan. 22, 2014, all of which are hereby expressly incorporated by reference into the present application.

TECHNICAL FIELD

This application is related to wireless communication, specifically performance by a coverage-limited user equipment or for a coverage-limited user equipment.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In next generation of LTE-A, it is considered configuring a system using a low cost and/or low specification (low performance) terminal mainly for a data communication such as reading an electric meter, measuring water level, surveillance, stock management of a vending machine, etc. The terminal may be called as machine type communication (MTC) device (MTC terminal) for a convenience of description.

As for the usage of the MTC device, it is efficient to use a MTC device with a low price and a low battery consumption since an amount of transmitted data may be small and there may occasionally be an uplink/downlink data transmission in a case of a communication using the MTC device.

SUMMARY OF INVENTION

Technical Problem

An object of the present invention is to provide method and apparatus for determining whether the user equipment needs coverage enhancement and/or whether network supports coverage enhancement efficiently.

Another object of the present invention is to provide method and apparatus for perform transmission power control efficiently when a user equipment needs coverage enhancement.

Another object of the present invention is to provide method and apparatus for determining how much the coverage enhancement needed for the user equipment. i.e., the coverage enhancement level efficiently.

Solution to Problem

An embodiment of the present application is a method of initial accessing by an user equipment (UE). The method comprises detecting a cell with primary synchronization signal (PSS) and/or secondary synchronization signal (SSS), detecting reference signal based on the detected synchronization signal, detecting broadcasting channel based on the detected reference signal and decoding master information block on the broadcasting channel, detecting system information block on a downlink data channel, and transmitting random access preamble on random access channel based on a system information obtained from the system information block, wherein whether coverage enhancement is needed or not is determined based on at least one of the detected signals and system information, and wherein coverage for the UE is enhanced when the coverage enhancement is determined as needed.

Another embodiment of the present application is a method of controlling transmission power by coverage limiting UE. The method comprises receiving cell specific reference signal, estimating path loss based on the cell specific reference signal and determining transmission power based on the estimated path loss, wherein the transmission power is adjust based on the number of repeated downlink transmission and threshold transmission power which is required by base station (BS), and wherein the threshold transmission power is determined based on the number of repeated downlink transmission.

Advantageous Effects of Invention

According to the present invention, whether the user equipment needs coverage enhancement and/or whether network supports coverage enhancement can be determined efficiently.

According to the present invention, transmission power control can be performed efficiently when an user equipment needs coverage enhancement.

According to the present invention, the coverage enhancement level can be determined efficiently.

MODE FOR THE INVENTION

Figure 1:
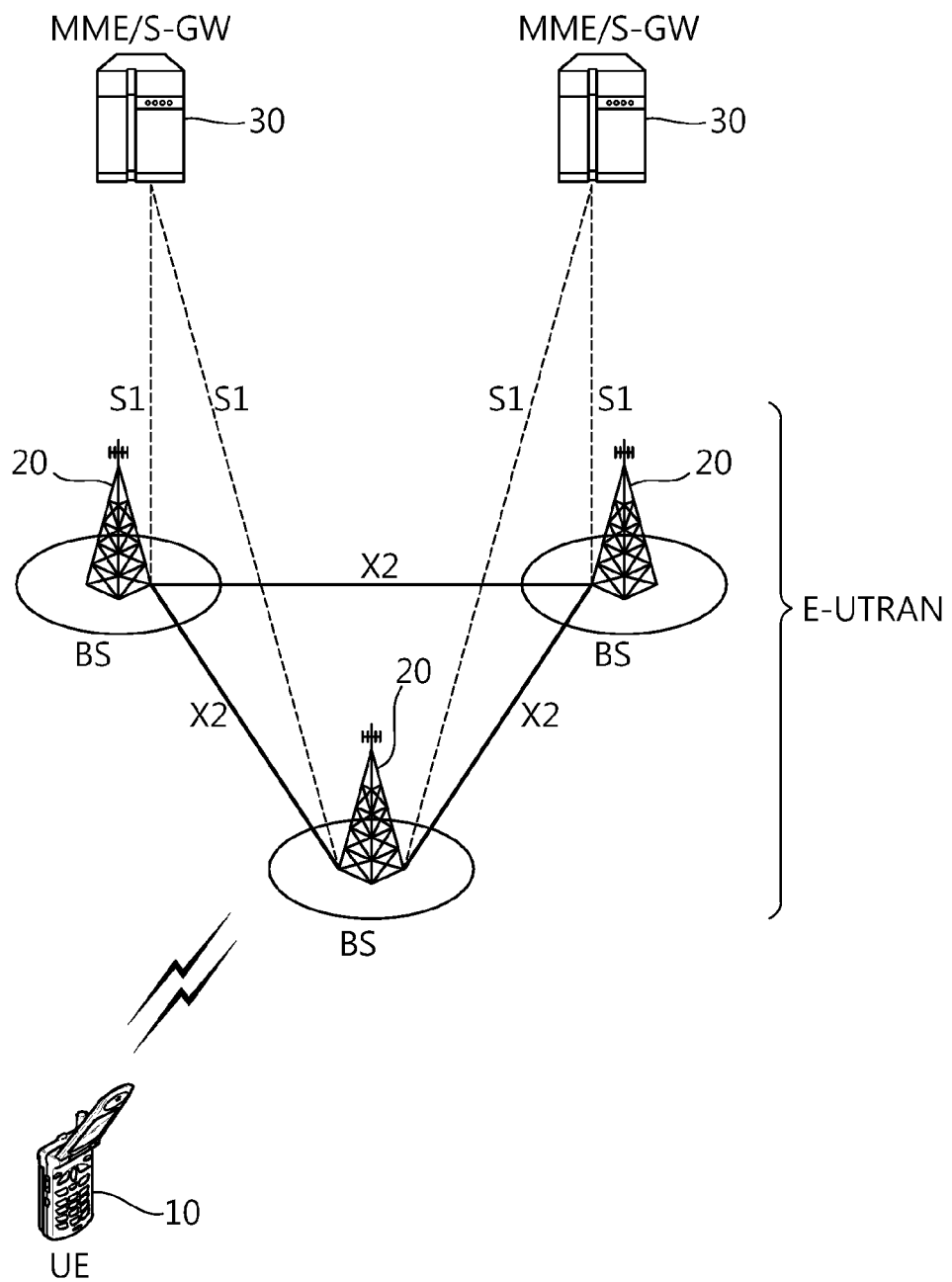
FIG. 1 shows a wireless communication system to which the present invention is applied.

FIG. 1 shows a wireless communication system to which the present invention is applied. The wireless communication system may also be referred to as an evolvedUMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
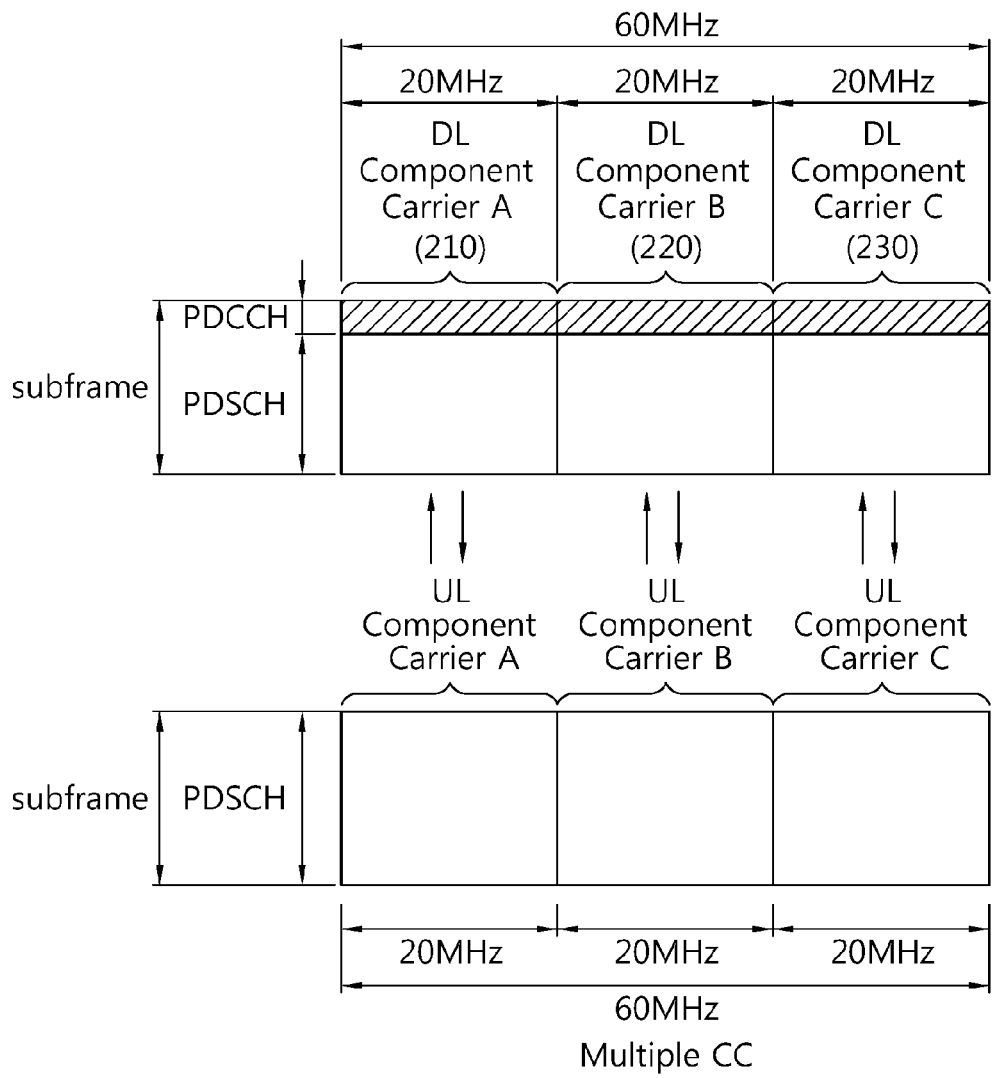
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
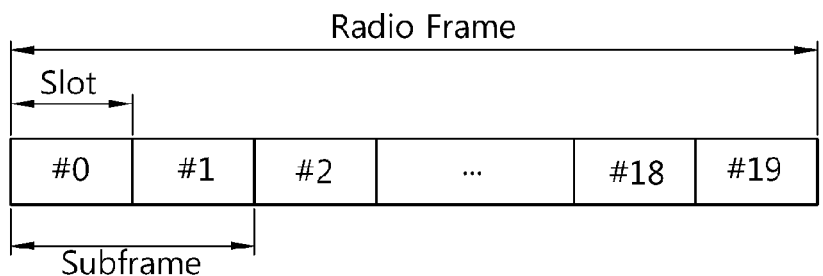
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
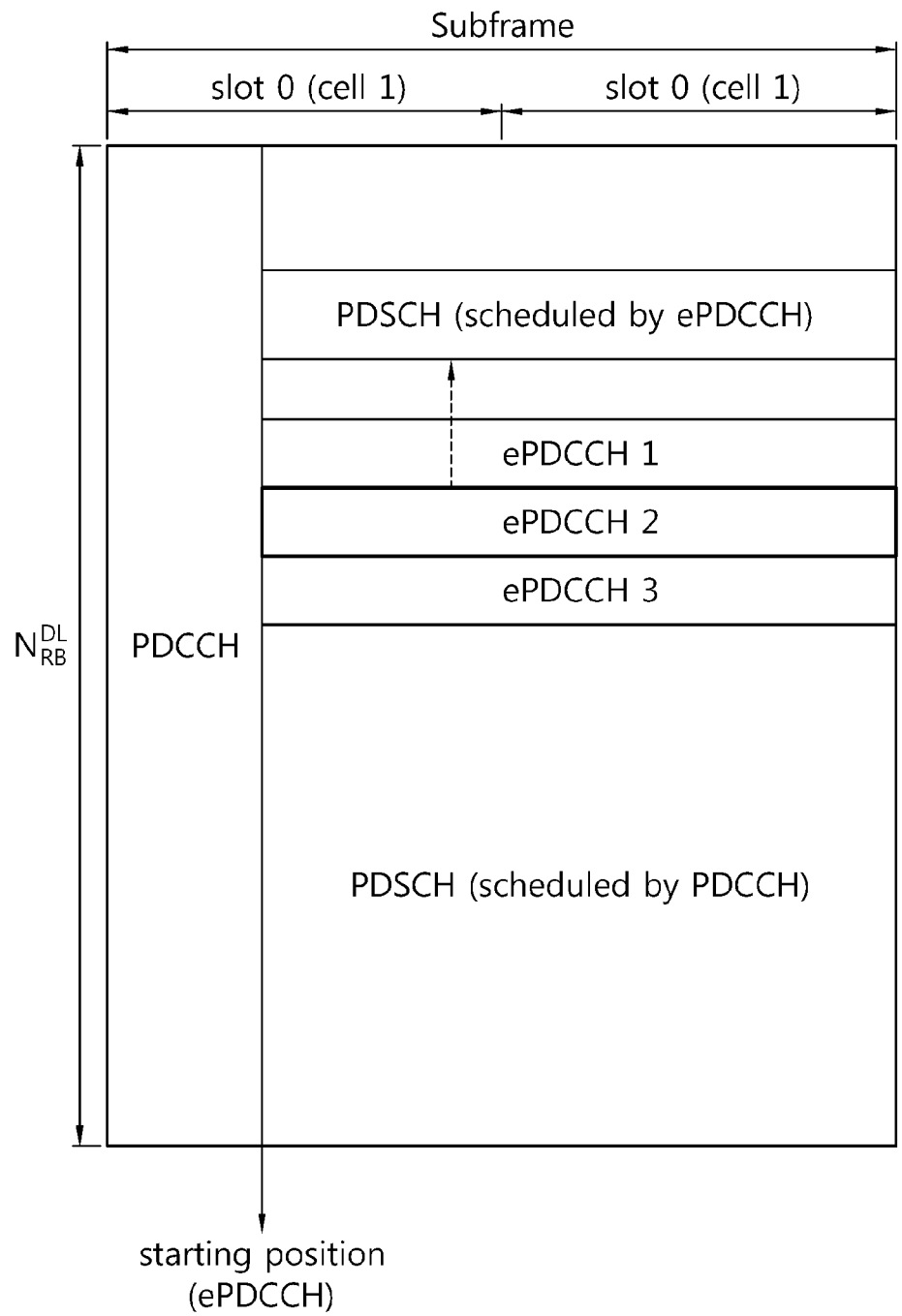
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, as wireless communications are to be used in various technical fields and for various purposes, it is considered configuring a system using a low cost and/or low specification (low performance) terminal mainly for a data communication such as reading an electric meter, measuring water level, surveillance, stock management of a vending machine, etc. This type of a terminal may be called as machine type communication (MTC) device (MTC UE).

As for the usage of the MTC device, it is efficient to use a MTC device with a low price and a low battery consumption since an amount of transmitted data may be small and there may occasionally be an uplink/downlink data transmission in a case of a communication using the MTC device.

Furthermore, it is expected that those MTC devices are installed in rather coverage-limited area such as basement. To enhance the coverage enhancement while reducing the cost of MTC devices, this application assumes that the network may handle both normal UEs and coverage limiting UEs which are enabled to operate with coverage enhancement techniques applied.

In the LTE, UE categories are specified. The normal UE may correspond to category 0 to 9 with no additional support for coverage enhancement. Further, it can be also the normal UE when the UE does not support coverage enhancement techniques even if it belongs to a newly defined UE category.

To avoid the unnecessary spectral efficiency degradation to handle coverage-limiting UEs, it is essential to do best "estimation" on the required coverage enhancement. Also, handling this new type of UEs should not jeopardize the legacy UEs which are not aware of the existence of coverage limiting UEs.

This application discusses a process where a coverage-limiting UE is associated with a network given the above constraints (i.e., minimizing the spectral efficiency degradation and no impact (in terms of specification) on legacy UEs).

Hereinafter, detailed descriptions for CSI as to the coverage limiting UE are provided with figures.

Figure 5:
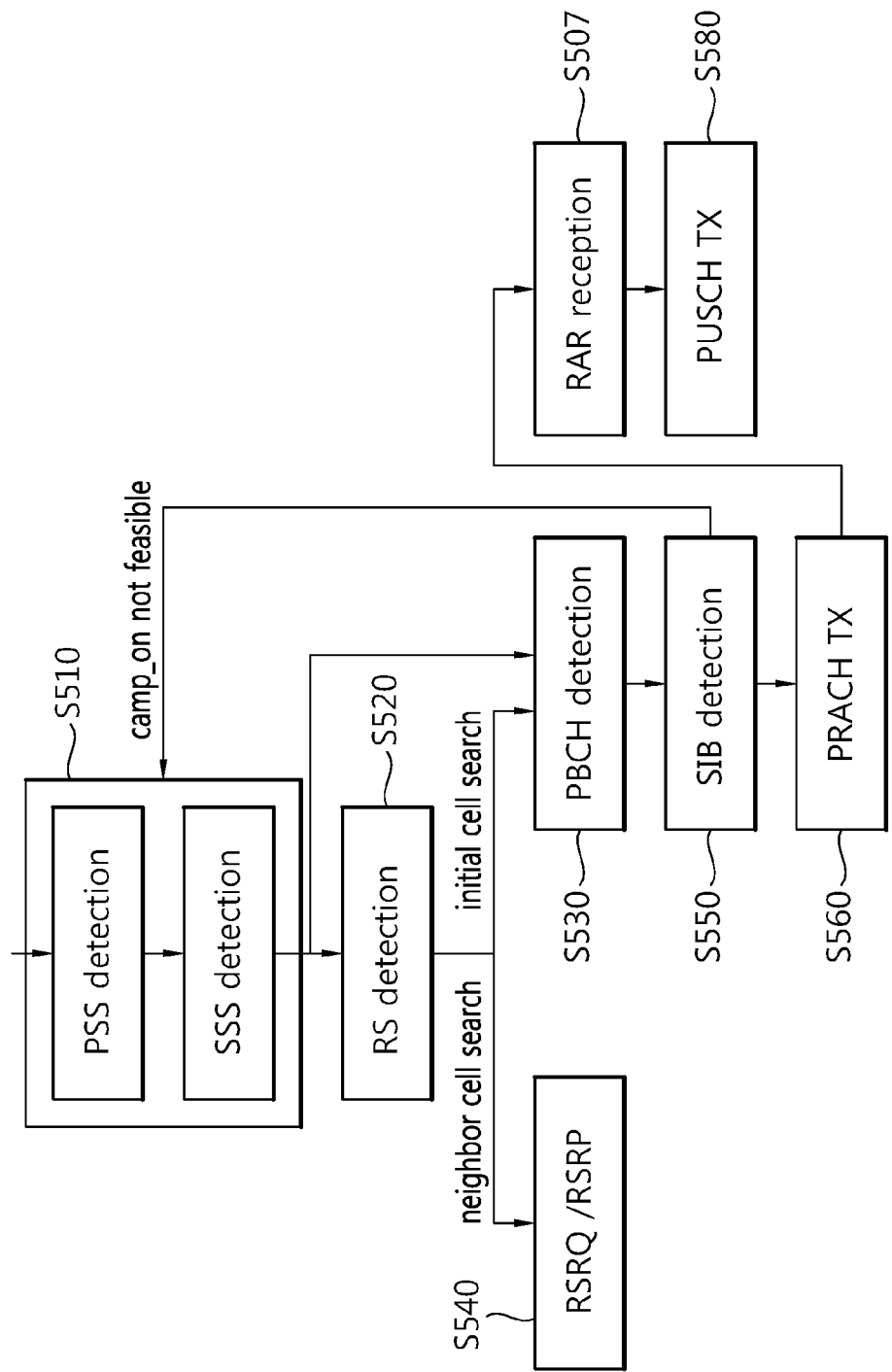
FIG. 5 is a flow chart that briefly describes as to UE cell association.

FIG. 5 is a flow chart that briefly describes as to UE cell association.

Referring to FIG. 5, UE may detect synchronization signal at step S510. For random access, UE needs to synchronize downlink timing. With primary synchronization signal (PSS)/secondary synchronization signal (SSS), the UE may synchronize downlink timing and The UE may derive physical cell ID.

In the case of FDD, the PSS may be transmitted within the last symbol of the first slot of subframes 0 and 5, while the SSS may be transmitted within the second last symbol of the same slot. That is, SSS may be transmitted just prior to the PSS.

In the case of TDD, the PSS may be transmitted within the third symbol of subframes 1 and 6. That is, the PSS may be transmitted within the DwPTS. The SSS may be transmitted in the last symbol of subframes 0 and 5. That is, SSS may be transmitted three symbols ahead of the PSS.

The UE may detect reference signal when the US synchronized to the downlink timing with the synchronization signals at step S520. The reference signal can be detected based on the synchronization using the detected synchronization signals. The reference signal may be cell specific reference signal (CRS).

The UE may detect broadcasting channel with the detected reference signal at step S530. The UE may detect physical broadcasting channel (PBCH) based on channel estimation using the reference signal. The UE may obtain master information block (MIB) from received PBCH. The MIB may includes information on downlink cell bandwidth, PHICH configuration of cell, system frame number (SFN), etc.

The UE may measure neighboring cell's RSRQ/RSRP at step S540. The UE may measure reference signal receive quality (RSRQ)/reference signal receive power (RSRP) with signals from neighboring cells.

The UE may detect system information block (SIB) at step S550. The SIB may be transmitted on the downlink data channel, e.g. PDSCH. Existence of SIB on the downlink data channel may be indicated by SI-RNTI on PDCCH.

In addition, the SIB may be categorized according to information therein. For example, SIB1 may include cell information, subframe allocation, special subframe configuration, scheduling for other SIBs on time domain, etc. SIB2 may include information needed to access a cell, for example, uplink cell bandwidth, random access parameter, uplink power control, etc.

The UE may transmit random access channel at step S560. The UE may transmit PRACH based on the detected SIB. The PRACH may contain random access preamble. There may be 64 available random access preamble sequences for each cell. The UE may select a preamble sequence and transmit on the PRACH.

The UE may receive random access response (RAR) from eNB at step S570. The RAR may contain information indicating the random access preamble sequences by detected by network and for which the RAR is valid, information on timing correction, scheduling grant, temporal identity for further communication TC-RNTI, etc.

The UE may transmit uplink signal at step S580. The UE may transmit uplink data channel, such as PUSCH based on the information obtained from the RAR.

Based on the initial process of UE described above, the initialization process for coverage limiting UE (MTC UE) is provided.

When a MTC UE is initialized, the MTC UE may first attempt to detect cells. The UE requiring coverage enhancement (such as MTC UE) should be able to identify itself whether the coverage enhancement is needed or not as the following steps could be different.

Thus, the UE may identify the necessity of coverage enhancement and the degree of coverage enhancement either at step S510 or step S530.

When a UE detects its coverage enhancement requirement at step 510 by PSS/SSS detection, overall the following alternative approaches (1) to (4) are feasible.

(1) Based on cell detection time: Based on how many PSS and/or SSS are read before identifying a cell, a UE may determine whether it requires coverage enhancement or not. For example, the UE may determine that the UE needs coverage enhancement when a predetermined threshold is less than average number of PSS and/or SSS read before identifying a cell. As another example, the UE may determine that the UE needs coverage enhancement when a predetermined threshold is less than minimum number of PSS and/or SSS read before identifying a cell. Yet another example, the UE may determine that the UE needs coverage enhancement when a predetermined threshold is less than maximum number of PSS and/or SSS read before identifying a cell. Further, the acquisition time of the selected cell (based on signal strength or by cell ID detection) may be determinant. The acquisition time of the selected cell may be used for determining whether the UE needs coverage enhancement based on the length of the acquisition time.

(2) Based on signal strength of a detected PSS/SSS: Assuming a cell ID is detected with the associated PSS/SSS, a UE may determine whether it requires coverage enhancement or not based on the signal strength of PSS/SSS. The UE may use average signal strength over the detection period for determining it requires coverage enhancement or not.

In addition, the UE may determine the degree of the coverage enhancement if needed based on the signal strength of PSS/SSS. The UE may also use average signal strength over the detection period for determining the degree of the coverage enhancement.

(3) Based on RSRQ or RSRP: After cell ID detection, a UE may perform radio resource management (RRM) measurement of the detected cell and may determine the coverage enhancement requirement for the detected cell. If this is used at step S510, RRM measurement would occur before PBCH detection.

(4) Based on pre-configuration: A UE may be preconfigured with the required coverage enhancement either based on the location or others.

When a UE detects its coverage enhancement requirement at step S530 by PBCH detection, it may detects its coverage with the following approaches (i) and (ii).

(i) Based on the number of "read" PBCH within 40 mesc to detect MIB successfully: A UE may iterate the process of reading PBCH within 40 msec period by increasing the number of read PBCHs. First, the UE attempts to read regular PBCH (4 PBCHs within 40 msec). If the UE succeeds decoding of MIB within one or a few attempts (i.e., within 40 msec or m*40 msec), the UE determine its coverage enhancement requirement is '0' (or a predetermined value) dB. If the UE fails, the UE shall increase the number of PBCHs to read to 8 (or x) within 40 msec. If the UE succeeds, the UE determine its coverage enhancement requirement to '3' (or a predetermined value cov_x) dB. Until the UE decodes MIB successfully, the UE iteratively performs PBCH decoding. The decoding can be performed until the maximum allowed PBCHs within 40 msec. A table mapping between the number of read PBCHs within 40 msec and the coverage enhancement requirement can be preconfigured (e.g., (x=8, 3 dB) (x=16, 6 dB) . . . (x=40, 16 dB) as table 1 or (x=4, 4 dB) (x=8, 7 dB) . . . (x=40, 20 dB) as table 2 assuming 4 dB power boosting is used).

TABLE 1

| number of read PBCHs/40 msec | coverage enhancement requirement (dB) |
|---|---|
| 8 | 3 |
| 16 | 6 |
| ... | ... |
| 40 | 16 |

TABLE 2

| number of read PBCHs/40 msec | coverage enhancement requirement (dB) |
|---|---|
| 4 | 4 |
| 8 | 7 |
| ... | ... |
| 40 | 20 |

(ii) Based on RSRQ or RSRP: After PBCH detection assuming the maximum coverage enhancement is required, a UE may determine its coverage enhancement requirement based on RRM measurement.

Also, a UE may be able to detect whether the carrier (eNB) supports coverage enhancement or not. A few approaches (a) to (c) can be considered.

(a) Based on cell ID: Assuming a set of cell IDs are reserved for eNBs which support coverage enhancement, by detecting a cell ID, the UE is able to identify whether the cell supports coverage enhancement or not. Furthermore, groups of cell IDs can be reserved for different coverage enhancement degrees.

For example, a group of cell IDs may be reserved for 5 dB coverage enhancement, another group of cell IDs may be reserved for 10 dB coverage enhancement, and the other group of cell IDs may be reserved for 20 dB coverage enhancement.

(b) Based on detecting "special signal": Assuming a cell which supports coverage enhancement transmits a special signal, by detecting the special signal, a UE may be able to identify the cell capability from coverage enhancement aspect. The detail description is following in below.

(c) Based on detecting redundant PBCHs or new PBCHs: Another approach is to identify the cell capability by detecting redundant or new PBCHs. Redundant PBCH or new PBCH may carry the information of coverage enhancement degree (e.g., CRC can carry the information of coverage enhancement rather than the number of antenna ports assuming the number of antenna port is fixed to a constant such as 4) or MIB itself may contains the target coverage enhancement degree. Or, the UE may detect the coverage enhancement degree by detecting the number of redundant PBCHs within 40 msec.

Assuming a UE identifies its coverage enhancement requirement at PSS/SSS detection phase (step S510), it needs to regard how to allow "scalable" PBCH design where a eNB selects the maximum coverage enhancement requirement and transmits redundant/repeated PBCHs to meet the chosen enhancement requirement. For example, 5 dB, 10 dB, 15 dB or 20 dB may be selected as the requirement where each requirement maps to 10 PBCHs, 20 PBCHs, 30 PBCHs, or 40 PBCHs respectively.

As there could be eNBs which do not support coverage-limiting UEs, it is also necessary to inform the UE of the capability of eNB.

In summary, whether eNB supports coverage-limiting UE and what is the maximum coverage enhancement support can be given if it is known to the UE at decoding PBCH.

One approach is to use "additional" signal at subframes where coverage-limiting UE targeting PBCHs are transmitted. The additional signal may carry the degree of coverage enhancement (similar to the number of antenna ports for PBCH) so that the UE can determine whether it can camp on the carrier or not.

Figure 6:
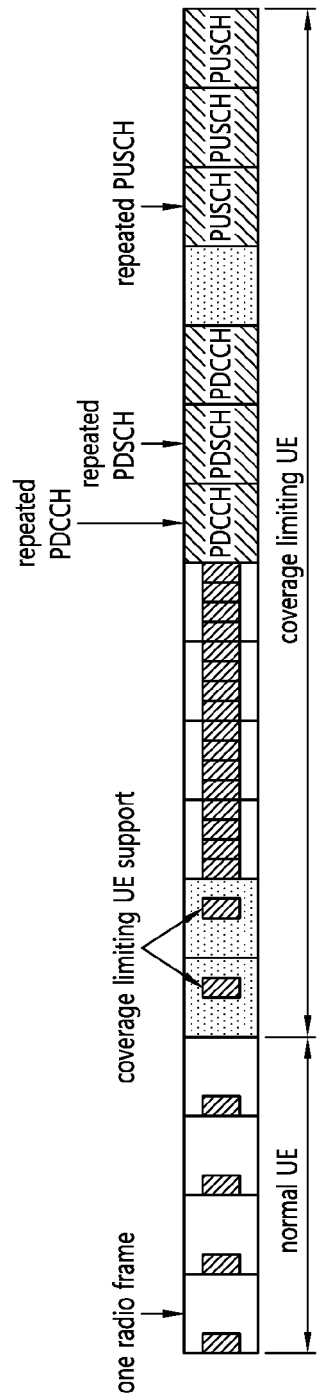
FIG. 6 illustrates indication mechanism for supporting coverage enhancement.

FIG. 6 illustrates indication mechanism for supporting coverage enhancement. Referring to FIG. 6, a UE may have to wait until coverage limiting UE support indication signals are supposed to be transmitted if coverage enhancement is needed.

For example, if coverage limiting UE support indication is planned to be scheduled every 1 second, a UE may wait at least 1 second to see whether there is any indication or not before moving to different frequency. If the UE is assumed as "synchronized", the coverage limiting UE support indication signals may be transmitted rather sporadically to minimize the impact on legacy UEs.

In terms of design the indication signal, a similar mechanism used for PBCH may be used or a new signal can be designed. Either way, the information of "the degree of coverage enhancement support" can be carried in the signal. In terms of the degree, the maximum number of repetition and other parameters for supporting coverage-enhancement would be determined.

As to step S520 (i.e. RS detection), when power boosting is used for RS transmission, it may impact the power control and/or RRM measurement.

One example is to boost the power on RS over the narrow-band (e.g., center 6 PRBs or a dedicated sub-band). When power boosting is used, the reference signal power may be higher than that indicated by SIB. If separate SIB transmission is used for coverage-limiting UEs, the boosted power may be indicated in SIB to the coverage-limiting UEs.

This approach however assumes that power boosting, if used, will be used throughout the entire transmission for the coverage-limiting UEs. Considering coexisting legacy UEs and coverage-limiting UEs, this case may not hold all the time.

It is possible that power boosting can be used in a subset of subframes and cannot be used in others. Thus, another approach is to signal the set of subframes where power boosting is used. Or, at the subframe, additional signal is used to indicate whether power boosting is used or not. If this additional signal is used to indicate the power boosting applicability, it may apply to all the signals transmitted in that subframe to the coverage-limiting UEs.

Power boosting degree (e.g., 3 dB, 6 dB) may be predetermined or signalled to the UE via SIB or higher layer signalling.

Yet another approach is not to inform the UE about power boosting. Rather, a UE is configured with a subset of subframes which it can use for RRM measurement and pathloss calculation. If there is no signalling either way, a UE may assume that the same power is used over the multiple subframes.

Alternatively, a coverage-limiting UE may assume that only MBSFN subframes will be used for coverage-limiting UEs (for PDSCH and PDCCH). In that case, a UE shall perform RRM and power control based on signals transmitted in MBSFN subframes. Or, a coverage-limiting UE can be (pre)configured with a subset of subframes where it can expect to receive data and those subframes will be used for RRM and power control reference.

As to step S540 (i.e., RRM measurement), assuming a coverage-limiting UE has limited mobility, RRM measurement on neighbour cells may not be so essential. Furthermore, it may increase the power consumption of the coverage-limiting MTC UEs.

Thus, this application also proposes as an embodiment for coverage limited UE (e.g., MTC UE) to "disable" neighbour cell RRM (both low cost UEs and coverage-limiting UEs). When neighbour cell RRM is needed, it can be explicitly enabled by the serving cell.

This may apply to both intra-frequency and inter-frequency RRM, and the trigger to enable RRM measurement can be enabled for each intra-frequency or inter-frequency RRM measurement respectively. Measurement gap can be configured so that a UE is able to detect PSS/SSS and RS for neighbour cells which support coverage-limiting UEs. The serving cell is expected to initiate the measurement when the signal quality to/from the coverage UE becomes worse or does not satisfy the coverage.

Considering the case where the serving cell may not work properly, a UE starts RRM measurement if the serving cell becomes "inactive" for more than a threshold or it detects radio link failure to the serving cell. In this case, the UE performs initial cell search.

In addition, there also needs performances for coverage-limited UE besides or with performances in initialization of the coverage-limited UE. Hereinafter, additional performance for coverage enhancement which may need beside or with described performances in initialization for the coverage-limiting UE.

Radio Link Failure (RLF)

Depending on the required coverage enhancement for a coverage-limiting UE, it is assumed that the maximum number of repetition for each channel is determined.

As an example, assume that a UE is configured with 20 times of PDCCH repetition to enhance 10 dB coverage. For this UE, how to perform radio link monitoring (RLM) may be different from a normal UE. Two overall approaches ① and ② can be considered as below.

① No RLM for the coverage-limiting UE: This approach may be called as inactivity based RLM as described below.

Figure 7:
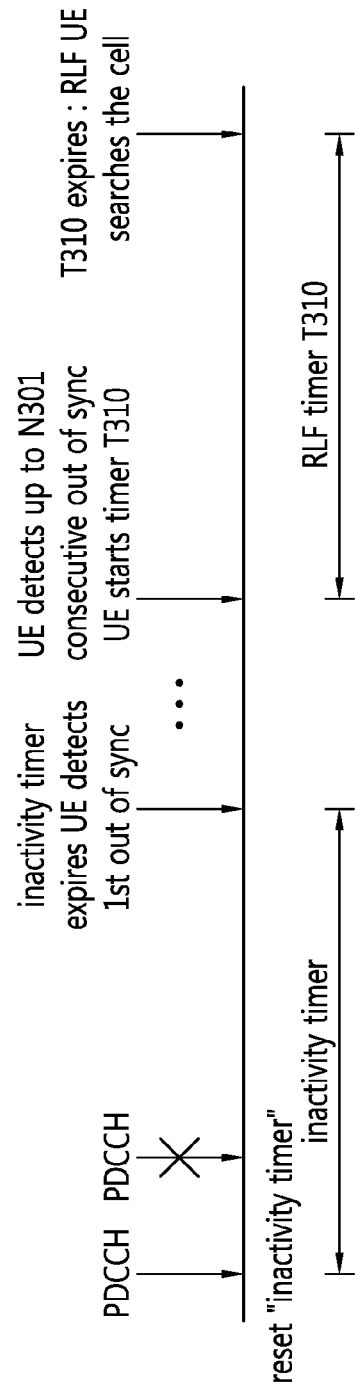
FIG. 7 briefly illustrates an example of inactivity based RLM.

FIG. 7 briefly illustrates an example of inactivity based RLM.

Assuming a UE is configured with a period where the serving cell transmits "hello" messages or "downlink data" or "request for data collection", etc, a UE may detect "out-of-sync" to the serving cell by detecting "inactive time" where it does not receive any data from the serving cell. For example, periodicity from the serving cell on any downlink data is 1 second, and it does not receive any data for more than 5 seconds, it assumes that the serving cell is out-of-sync. Similar to RLM, a timer can be defined to initiate the radio link failure by detecting the inactivity time.

② RLM based on "aggregated/repeated" PDCCH: This approach may be called as aggregated PDCCH based RLM.

Figure 8:
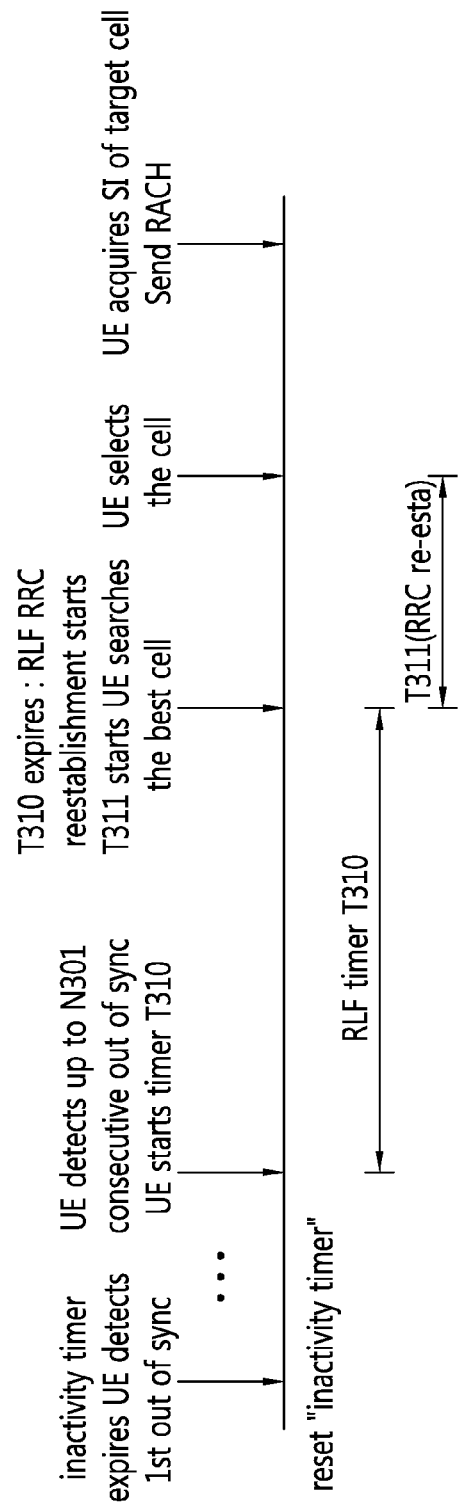
FIG. 8 briefly illustrates an example of aggregated PDCCH based RLM.

FIG. 8 briefly illustrates an example of aggregated PDCCH based RLM.

A UE performs RLM with repeated PDCCHs in this approach. Assuming a hypothetical PDCCH TX occurs over the configured number of subframes, UE performs RLM for the repeated PDCCHs. Overall, the timer and process may have to be customized with consideration of the repetition. This may require a new test case defined. More specifically, if there are multiple repetition levels specified in the system, the repetition level chosen for RLM testing may be based on the maximum repetition level or the number can be higher layer configured.

The reason may be to trigger RLF only if the UE cannot be served by the network even with the maximum or allowed number of repetitions.

Repetition Level Increase or Decrease

To optimize and minimize the repetition overhead, it is expected that a UE can be higher layer configured with the number of repetitions for each channel or a single number for all the channels. However, due to inaccurate measurement or potentially UE movement, it is also possible to change the repetition level. However, when repetition level is reconfigured, there may be ambiguity between eNB and the UE.

Thus, repetition level for DCI format 1A may need to be fixed regardless of the needed number of repetitions at least for common search space (CSS) (may be except for RA-RNTI). This can be the same number used for cell-common PDSCH transmission or can be signalled via SIB or MIB. More specifically, the number of repetition used for DCI 1A can be assumed to be the same if scheduled via CSS. As known, DCI 1A may supports allocation of frequency-contiguous resource blocks and can be used in all transmission modes.

In RRC reconfiguration period, when DCI 1A is used, this repetition number can be assumed. Similar to PRACH ramping, for retransmission of PDCCH, different number of repetition can be considered. However, due to potentially misalignment between UE and eNB, increasing repetition number can be ambiguous. Thus, it can be considered to change aggregation level per retransmission (e.g., from $1 \rightarrow 2 \rightarrow 4 \rightarrow 8$ for 4 retransmissions).

In general, it is desired to use maximum or use a margin so that PDCCH reliability can be guaranteed in most cases. For PDSCH, based on redundancy version (RV), this can be considered. However, since UE can use buffer, the number of repetition for repetition can be reduced. Thus, for retransmission, the network can adapt the condition based on its observations.

Still, there is a need to switch repetition level from a UE perspective due to mobility or environment change. A few potential rules to switch or move to next level (or previous level) can be considered. For example, if retransmission for either PUSCH or PDSCH occurs more than a threshold for a HARQ (or use a timer), then a UE and eNB can assume the next level should be used instead.

To eliminate latency and overhead of RRC reconfiguration, autonomous adaptation can be considered. Until it is assured, a UE may perform blind decoding on both levels to detect data. For the case to reduce repetition level, it can be determined by eNB measurement or based on UE measurement. This may be performed by RRC reconfiguration or higher layer signaling or via DCI. Or, a similar rule can be applied where if transmission has been successfully accomplished by one attempt (for more than x times), then UE and eNB may assume to reduce the repetition level.

RRC Idle Mode Switch from RRC Connected

A coverage-limiting UE and/or low cost MTC UE may not be switched to RRC_Idle mode to minimize the power consumption to handle RRC_Idle functionalities.

Alternatively, a UE may transit to RRC_Idle mode to maximize the discontinuous reception (DRX) cycle. However, the UE does not perform automatic cell reselection to minimize the overhead. In other words, a UE can enjoy all the features of RRC_Idle mode whereas cell reselection is performed by the network. To support this, the network should maintain UE context and thus, the UE should support minimum functions to maintain the connectivity such as sending periodic RRM measurement reports.

RRM measurement as indicated earlier may be triggered by the serving cell or by RLF. If RRC_Idle mode is not supported for a coverage limiting UE and/or a low cost MTC UE, the increased DRX cycle in RRC_Connected mode may be necessary. Even in RRC_Idle mode, a longer DRX cycle may be necessary to maximize the lifetime of battery-operated MTC devices.

Uplink Power Control

For a coverage-limiting UE, uplink power control may be different from a normal UE as it transmits the uplink channels/signals over multiple subframes. For example, PRACH power control may be specified as MATH 1.

$$P_{PRACH}=\min\{P_{CMAX,c}(i), \text{PREAMBLE\_RECEIVED\_TARGET\_POWER}+PL_c\}\_[dBm] \quad <\text{MATH 1}>$$

Here, $P_{CMAX,c}(i)$ is the configured UE transmit power defined in 3GPP TS 36.331 for subframe i of serving cell c and $PL_c$ is the downlink pathloss estimate calculated in the UE for serving cell c.

The parameter PREAMBLE_RECEIVED_TARGET_POWER is determined based on PRACH configuration carried in SIB2 (based on ramp-on parameter and initial received power). How to handle these parameters, a few approaches can be considered.

First, for coverage-limiting UEs and/or low cost MTC UEs, it can be assumed that a separate SIB2 can be transmitted. In this case, separate parameters applicable to coverage-limiting UEs and/or low cost MTC UEs can be considered. Even in this case, unless the parameters are differently configured for the different number of PRACH repetition, a UE may have to interpret or calculate the power a bit differently if it does repeat the PRACH transmission to enhance the coverage.

For example, using PRACH format 3, a UE requiring 5 dB coverage enhancement may retransmit 10 times of the same PRACH, whether the same parameter PREMABLE_RECEIVED_TARGET_POWER as specified in TS 36.331/TS 36.321 should be considered needs to be reconsidered. In this case, "scale down" the power according to the number of repetition of PRACH may be used.

One example is to linearly scale down the PREAMBLE_RECEIVED_TARGET_POWER per the number of repetition (either linear or log form) or a UE may be pre-configured with InitialReceivedTargetPower per each coverage enhancement requirement category (e.g., see the below). For example, Power of PRACH $P_{PRACH}$ may be defined as MATH 2.

$$P_{PRACH}=\text{Min}\{P_{CMAX,c}(i), \text{PREAMBLE\_RECEIVED\_TARGET\_POWER}-\alpha+PL_c\}\_[dBm] \quad <\text{MATH 2}>$$

Here, $\alpha$ is determined based on the number of repetition. More specifically, different $\alpha$ values for each repetition level can be signaled via SIB or higher layer signaling.

The table 3 shows an example to configure different target power for each repetition level which can be preconfigured or dynamically or semi-statically configured by higher layer or SIB signaling.

TABLE 3

| Coverage Enhancement requirement | Number of PRACH repetition | preambleInitialReceivedTargetPower |
|---|---|---|
| 5 dB | 10 | ENUMERATED {dBm-110, dBm-108, dBm-106, dBm-104, dBm-102, dBm-100, dBm-98, dBm-96, dBm-94, dBm-92, dBm-90, dBm-88, dBm-86, dBm-84, dBm-82, dBm-80} |
| 10 dB | 20 | ENUMERATED {dBm-100, dBm-98, dBm-96, dBm-94, dBm-92, dBm-90, dBm-88, dBm-86, dBm-84, dBm-82, dBm-80, dBm-78, dBm-76, dBm-74, dBm-72, dBm-70} |
| 15 dB | 80 | ENUMERATED {dBm-80, dBm-78, dBm-76, dBm-74, dBm-72, dBm-70, dBm-68, dBm-66, dBm-64, dBm-62, dBm-60, dBm-58, dBm-56, dBm-54, dBm-52, dBm-50} |
| 20 dB | 200 | ENUMERATED {dBm-70, dBm-68, dBm-66, dBm-64, dBm-62, dBm-60, dBm-58, dBm-56, dBm-54, dBm-52, dBm-50, dBm-48, dBm-46, dBm-44, dBm-42, dBm-40} |

Alternatively, a UE can be configured with maximum power all the time regardless of initial received power requirement configured by eNB: $P_{PRACH}=P_{CMAX,c}(i)$.

In terms of determining $P_{PRACH}$ whenever PRACH transmission occurs, during the one RACH procedure, it is desirable PREAMBLE_RECEIVED_TARGET_POWER is not decreased. Thus, a UE may take new PREAMBLE_RECEIVED_TARGET_POWER value only when it is bigger than previously used PREAMBLE_RECEIVED_TARGET_POWER.

For instance, when PRACH retransmission occurs over different repetition level, PREAMBLE_RECEIVED_TARGET_POWER may be recalculated and PREAMBLE_TRANSMISSION_COUNTER may be reset to 1.

In this case, if newly calculated PREAMBLE_RECEIVED_TARGET_POWER is smaller than previous PREAMBLE_RECEIVED_TARGET_POWER, the target power is not decreased. It may take the previous PREAMBLE_RECEIVED_TARGET_POWER as a starting point.

One example of calculating PREAMBLE_RECEIVED_TARGET_POWER is shown in MATH 3.

$$\text{PREAMBLE\_RECEIVED\_TARGET\_POWER}=\text{preambleInitialReceivedTargetPower}+10*\log_{10}(\text{number of repetitions})+\text{DELTA\_PREAMBLE}+(\text{PREAMBLE\_TRANSMISSION\_COUNTER}-1)*\text{powerRampingStep} \quad <\text{MATH 3}>$$

If preambleInitialReceivedTargetPower is changed according to repetition level, the aggregated target power is not lower than before. Thus, one example is such as MATH 4.

$$\text{PREAMBLE\_RECEIVED\_TARGET\_POWER}=\max\{\text{previous PREAMBLE\_RECEIVED\_TARGET\_POWER}, \text{preambleInitialReceivedTargetPower}+10*\log_{10}(\text{number of repetitions})+\text{DELTA\_PREAMBLE}+(\text{PREAMBLE\_TRANSMISSION\_COUNTER}-1)*\text{powerRampingStep}\} \quad <\text{MATH 4}>$$

This principle can be applied to the case where different $\alpha$ values are used per each repetition level to calculate $P_{PRACH}$. In this case, the calculation of $P_{PRACH}$ can be as follows:

Let's call $P_{PRACH\_prev}$ as power used for the last PRACH transmission in different repetition level. Then, the aggregated power would be $P_{PRACH\_prev}+10*\log_{10}$ (number_of_repetion_prev_level).

Let's call $P_{PRACH\_new}=P_{PRACH}$, then $P_{PRACH}$ can be defined as MATH 5.

$$P_{PRACH}=\text{Min}\{P_{CMAX,c}(i), \text{PREAMBLE\_RECEIVED\_TARGET\_POWER}-\alpha+PL_c\} \quad <\text{MATH 5}>$$

Then, the aggregated power would be $P_{PRACH\_new}+10*\log_{10}$ (number_of_repetion_current_level)

Then, $P_{PRACH\_prev}*$number_of_repetion_prev_level<= $P_{PRACH\_new}+10*\log_{10}$ (number_of_repetion_current_level). If not, $P_{PRACH\_new}$ should be $P_{PRACH\_prev}+10*\log_{10}$(number_of_repetion_prev_level/number_of_repetion_current_level).

Note that functions may change. Principle is maintained where potentially aggregated received power (or receiver power per each PRACH segment in a PRACH repetition bundle) is not decreased while retransmission.

Alternatively, the power ramping for any retransmission can be preserved such that $P_{PRACH}$ should not be decreased. In this case, one calculation of $P_{PRACH}$ is same as MATH 6 for PRACH retransmission and MATH 7 for PRACH initial transmission if power ramping is used. Or, MATH 8 can be applied if maximum power is assumed.

$$P_{PRACH}=\max\{\min\{P_{CMAX,c}(i), \text{PREAMBLE\_RECEIVED\_TARGET\_POWER}-\alpha+PL_c\}, P_{PRACH}\} \quad <\text{MATH 6}>$$

$$P_{PRACH}=\min\{P_{CMAX,c}(i), \text{PREAMBLE\_RECEIVED\_TARGET\_POWER}-\alpha+PL_c\} \quad <\text{MATH 7}>$$

$$P_{PRACH}=P_{CMAX,c}(i) \quad <\text{MATH 8}>$$

Alternatively, power ramping between levels can be also considered where initial power of next repetition level (or coverage level) can be always greater than the last power used in previous repetition level (or coverage level) with delta difference (from the accumulated power perspective rather than individual PRACH per one PRACH transmission, i.e., accumulated power over repetition). If this is used, PRACH power for each PRACH transmission can be calculated such as MATH 9.

PREAMBLE_RECEIVED_TARGET_POWER=
{preambleInitialReceivedTargetPower+DELTA_PREAMBLE+(PREAMBLE_TRANSMISSION_COUNTER−1)*powerRampingStep}−10*$\log_{10}$(number of repetitions). <MATH 9>

In other words, the accumulated power (if accumulated at the eNB) will increase as the retransmission counter increases. In this case, the same value of preambleInitialReceivedTargetPower is assumed to be used regardless of repetition counter or coverage levels.

This can apply to PRACH repetition over multiple trials over different repetition levels. For example, let's assume that a UE starts PRACH transmission at repetition level 1 with power ramping. After a few trials or reaching the maximum power (PCmax), if a UE has not completed RACH procedure, it shall move to the next repetition level. For a next repetition level, power ramping-up can be achieved such as MATH 10.

PREAMBLE_RECEIVED_TARGET_POWER=
preambleInitialReceivedTargetPower+10*$\log_{10}$(number of repetitions)+DELTA_PREAMBLE+(PREAMBLE_TRANSMISSION_COUNTER−1)*powerRampingStep <MATH 10>

Here, PREAMBLE_TRANSMISSION_COUNTER is not reset per each repetition level and increases up to the maximum number across the trials of different repetition levels where the same preambleInitialReceivedTargetPower is used (which is accumulated target power assuming repetition).

In summary, the power control can be summarized depending on how the number of retransmission for PRACH and the multiple coverage/repetition level is used. As to this point, the two alternatives Alt1 and Alt2 can be considered as below.

<Alt1> Use different targetreceived power per each repetition level: In this case, target received power is calculated based on the assumption of multiple repetition. Thus, each PRACH power control is simply calculated using pathloss and target received power. In this approach, it is reasonable to use separate power ramping per each repetition/coverage level, i.e., reset retransmission counter in every coverage/repetition level.

<Alt2> Use one target received power regardless of the number of repetition. In this case, PRACH power for individual PRACH transmission should be calculated with consideration of multiple repetitions. Thus, each PRACH transmission will use lower power than the calculated using target received power and pathloss as the network may accumulate multiple PRACH repetitions. Using this approach, three alternatives can be considered. In this case, PRACH power is calculated as MATH 11.

PREAMBLE_RECEIVED_TARGET_POWER=
{preambleInitialReceivedTargetPower+DELTA_PREAMBLE+(PREAMBLE_TRANSMISSION_COUNTER−1)*powerRampingStep}−10*$\log_{10}$(number of repetitions). <MATH 11>

In this case, when repetition number changes, due to different number of repetitions per coverage level, even though the coverage level increases, the individual PRACH power may be reduced compared to previous coverage/repetition level. In that case, it may be also assumed that a UE will use no smaller power than used previously when coverage level switches. Alternatively, since accumulated power will be increased, thus, may be individual PRACH transmission with lower power may be used.

When a separate SIB is assumed for coverage-limiting UEs and/or low cost MTC UEs, if there is no parameter for PRACH power configurations (ramp-up and initial power), a UE may assume default values (maximum ramp-up and maximum initial power) will be used for PRACH configuration.

In terms of PUCCH and/or PUSCH power control, overall three approaches (I) to (III) can be considered as follows.

(I) Use the configured PCmax $P_{CMAX,c}(i)$ all the time regardless of power control commands. In this case, a UE may ignore TPC field or TPC commands or TPC field may be omitted or used for something else if used.

(II) The power used for uplink transmission may be preconfigured per coverage enhancement requirement. The power can be preconfigured or higher layer configured according to the coverage enhancement requirement. Similar to (I), this approach would not change the power unless the configuration changes. In terms of configurations, the power can be configured with the number of repetition or the required coverage enhancement together, or it can be higher layer configured separately.

For data retransmission, the power may be increased with $\Delta_{retx}$ where $\Delta_{retx}$ will be preconfigured or higher layer configured. In other words, the power for retransmission would be "pre-configured power level"+$\Delta_{retx}$. $\Delta_{retx}$ can be a negative value in such case the power may be decreased for the retransmission.

Another alternative option for the configuration is to configure "MCS" and/or power level and/or the number of repetition together. When MCS level becomes higher, the repetition number may be increased or power level may be increased.

(III) Dynamic power adaptation (keep Rel-8 of LTE behavior) is used to increase/decrease or set the uplink power same as the current specification.

If this is used, in terms of "accumulation" mode handling, three alternative approaches can be considered.

One is to "disable" accumulation mode for coverage-limiting and/or low cost MTC UEs to eliminate potential ambiguity to address the lost or repeated power control.

Second approach is to allow accumulation mode, where the accumulation can be applied to the repeated transmissions equally. For example, TPC command indicates $\delta_{PUCCH}$=3 dB, then PUCCH transmission power will be increased to 3 dB for each repeated transmission.

The last approach is to scale down the power accumulation values over the redundant transmissions. For example, $\delta_{PUCCH}$=3 dB with 10 repeated PUCCH transmissions, 0.3 dB→rounded to 1 dB may be applied to each PUCCH transmission instead of 3 dB enhancement for each one. This last approach may be applied to "absolute" power control mode as well.

Scalability of SIB Coverage Enhancement

Assuming eNB may select the coverage enhancement degree and then choose the number of repetition for PBCHs and power boosting degree, the coverage enhancement support for SIB transmission can be determined according to the coverage enhancement support for PBCH.

For example, if eNB selects 5 dB coverage enhancement support and then repeats 20 times PBCH per 40 msec window, the number of redundant/repeated SIB transmissions can be determined based on 5 dB coverage enhancement as well. For example, 10 times of SIB retransmission may be determined.

If coverage enhancement degree is signalled to the UE via additional signal or PBCH or higher layer signalling, the number of SIB retransmission can be signalled as well. Or, a predetermined mapping between coverage enhancement and the number of SIB retransmission and/or power boosting can be used instead. Or, the mapping table may be higher layer configured or signalled by SIB.

Moreover, the bundled SIB transmission may start from a predetermined position which can be determined by repeated PBCH location and an offset. For example, if PBCH repetition occurs in every 1 second with 80 msec duration (i.e., PBCH repetition occurs over 80 msec duration in every 1 second) where PBCH repetition occurs in the first 8 radio frames of every 1 second, then SIB repetition can occur every 1 second where the starting point of SIB repetition would be "80 msec+offset" where offset can be predetermined or signalled by PBCH. The duration of SIB repetition may be signalled by PBCH or predetermined.

SIB Sharing

SIB may be shared between coverage enhancement mode UEs and non-coverage enhancement mode UEs.

Due to its large overhead, it is considered to share system information between coverage enhancement mode UEs and non-coverage enhancement mode UEs at least a subset of SIBs such as SIB1 and/or SIB2.

In this case, since the necessary information for coverage-enhancement mode UEs and non-coverage enhancement mode UEs are different, two approaches should be considered.

First approach is to add additional fields in existing SIBs to carry the additional information for coverage-enhancement mode UEs and the other approach is to define different behaviour/interpretation on existing fields.

There could be a few examples where different interpretation/behaviour can be allowed. Table 4 shows an example in SIB1, SIB1 as for this approach.

TABLE 4

```
SystemInformationBlockType1 ::= SEQUENCE {
    cellAccessRelatedInfo           SEQUENCE {
        plmn-IdentityList               PLMN-IdentityList,
        trackingAreaCode                TrackingAreaCode,
        cellIdentity                    CellIdentity,
        cellBarred                      ENUMERATED {barred, notBarred},
        intraFreqReselection            ENUMERATED {allowed, notAllowed},
        csg-Indication                  BOOLEAN,
        csg-Identity                    CSG-Identity         OPTIONAL    -- Need OR
    },
    cellSelectionInfo               SEQUENCE {
        q-RxLevMin                      Q-RxLevMin,
        q-RxLevMinOffset                INTEGER (1..8)       OPTIONAL    -- Need OP
    },
    p-Max                           P-Max                    OPTIONAL,               -- Need OP
    freqBandIndicator               INTEGER (1..64),
    schedulingInfoList              SchedulingInfoList,
    tdd-Config                      TDD-Config               OPTIONAL,   -- Cond TDD
    si-WindowLength                 ENUMERATED {
                                        ms1, ms2, ms5, ms10, ms15, ms20,
                                        ms40},
    systemInfoValueTag              INTEGER (0..31),
    nonCriticalExtension            SystemInformationBlockType1-v890-IEs
    OPTIONAL
}
```

For example, schedulingInfoList can be shared between two mode UEs where non-coverage enhancement mode UE follows Rel-11 specification to interpret the values whereas coverage-enhancement mode UEs may assume that SI window can be mapped differently which can be specified. For example, si-Periodicity can be mapped to {8*m radio frames, 16*m radio frames, 64*m radio frames, . . . } where m can be the maximum repetition number for SIB PDSCHs (e.g., 10).

Also, if coverage-enhancement mode UEs are not required to read SIB3 to SIB13, schedulingInfo for SIB3-13 can be ignored. Furthermore, si-WindowLength can be interpreted differently as well. A simple mechanism is to scale the window size to m times such that si-WindowLength for coverage enhancement mode UEs would become si-WindowLength*m.

For SIB2, table 5 shows an example of the approach.

TABLE 5

```
SystemInformationBlockType2 ::=          SEQUENCE {
    ac-BarringInfo                           SEQUENCE {
        ac-BarringForEmergency                   BOOLEAN,
        ac-BarringForMC-Signalling               AC-BarringConfig           OPTIONAL,  -- Need OP
        ac-BarringForMC-Data                     AC-BarringConfig           OPTIONAL,  -- Need OP
    }                                                                       OPTIONAL,  -- Need OP
    radioResourceConfigCommon                RadioResourceConfigCommonSTB,
    ue-TimersAndConstants                    UE-TimersAndConstants,
    freqInfo                                 SEQUENCE {
        ul-CarrierFreq                           ARFCN-ValueEUTRA           OPTIONAL,  -- Need OP
        ul-Bandwidth                             ENUMERATED {n6, n15, n25, n50, n75, n100}
                                                                            OPTIONAL,  -- Need OP
        additionalSpectrumEmission               AdditionalSpectrumEmission
    },
    mbsfn-SubframeConfigList                 MBSFN-SubframeConfigList       OPTIONAL,  -- Need OR
    timeAlignmentTimerCommon                 TimeAlignmentTimer,
    ...,
    lateNonCriticalExtension                 OCTET STRING                   OPTIONAL,  -- Need OP
    [[ ssac-BarringForMMTEL-Voice-r9            AC-BarringConfig            OPTIONAL,  -- Need OP
       ssac-BarringForMMTEL-Video-r9            AC-BarringConfig            OPTIONAL   -- Need OP
    ]],
    [[ ac-BarringForCSFB-r10                    AC-BarringConfig            OPTIONAL   -- Need OP
    ]]
}
AC-BarringConfig ::=                     SEQUENCE {
    ac-BarringFactor                         ENUMERATED {
                                                 p00, p05, p10, p15, p20, p25, p30, p40,
                                                 p50, p60, p70, p75, p80, p85, p90, p95},
    ac-BarringTime                           ENUMERATED {s4, s8, s16, s32, s64, s128, s256, s512},
    ac-BarringForSpecialAC                   BIT STRING (SIZE (5))
}
MBSFN-SubframeConfigList ::=             SEQUENCE (SIZE (1..maxMBSFN-Allocations)) OF MBSFN-
SubframeConfig
```

In this case, the coverage-limiting UE (the coverage enhancement mode UE) may interpret differently on radioResourceConfigCommon as table 6.

TABLE 6

```
RadioResourceConfigCommsonSIB ::=        SEQUENCE {
        rach-ConfigCommon                    RACH-ConfigCommon,
        bcch-Config                          BCCH-Config,
        pcch-Config                          PCCH-Config,
        prach-Config                         PRACH-ConfigSIB,
        pdsch-ConfigCommon                   PDSCH-ConfigCommon,
        pusch-ConfigCommon                   PUSCH-ConfigCommon,
        pucch-ConfigCommon                   PUCCH-ConfigCommon,
        soundingRS-UL-ConfigCommon           SoundingRS-UL-ConfigCommon,
        uplinkPowerControlCommon             UplinkPowerControlCommon,
        ul-CyclicPrefixLength                UL-CyclicPrefixLength,
        ...,
        [[ uplinkPowerControlCommon-v1020    UplinkPowerControlCommon-v1020   OPTIONAL  -- Need OR
        ]]
}
```

PRACH-ConfigCommon
Table 7 describes PRACH-ConfigCommon.

TABLE 7

```
RACH-ConfigCommon ::=        SEQUENCE {
    preambleInfo                 SEQUENCE {
        numberOfRA-Preambles         ENUMERATED {
```

TABLE 7-continued

```
                                        n4, n8, n12, n16 ,n20, n24, n28,
                                        n32, n36, n40, n44, n48, n52, n56,
                                        n60, n64},
    preamblesGroupAConfig           SEQUENCE {
        sizeOfRA-PreamblesGroupA        ENUMERATED {
                                            n4, n8, n12, n16 ,n20, n24, n28,
                                            n32, n36, n40, n44, n48, n52, n56,
                                            n60},
        messageSizeGroupA               ENUMERATED {b56, b144, b208, b256},
        messagePowerOffsetGroupB        ENUMERATED {
                                            minusinfinity, dB0, dB5, dB8, dB10, dB12,
                                            dB15, dB18},
        ...
    }               OPTIONAL                        -- Need OP
},
powerRampingParameters          SEQUENCE {
    powerRampingStep                ENUMERATED {dB0, dB2,dB4, dB6},
    preambleInitialReceivedTargetPower  ENUMERATED {
                                        dBm-120, dBm-118, dBm-116, dBm-114, dBm-112,
                                        dBm-110, dBm-108, dBm-106, dBm-104, dBm-102,
                                        dBm-100, dBm-98, dBm-96, dBm-94,
                                        dBm-92, dBm-90}
},
```

For numberOfRA-Preambles, coverage-enhancement mode UEs may assume that the maximum number of RA-preambles (e.g., 64)–numberOfRA-Preambles can be used for coverage-enhancement mode UEs. For example, if numberOfRA-Preambles is 64, then coverage-enhancement mode UE may assume that no preamble is reserved for coverage-enhancement mode UE.

If multiple levels of repetition numbers are allowed more than one for coverage-enhancement mode UEs, a new parameter can be added (such as repetition level) in the SIB. The available preambles can be divided to multiple levels of repetition equally or with weight per repetition level. For example, if numberOfRA-Preambles=4, then 60 preambles are available for coverage enhancement mode UEs where if three repetition levels are specified, 20 preambles can be used for each repetition level in the increasing order.

Additionally, messagePowerOffsetCEGroup can be added which can be used for coverage enhancement mode UEs.

MBSFN-SubframeConfigList

If coverage UE is configured with using MBSFN subframes for transmission, UE should assume that the configured MBSFN subframe in this field is used for data transmission only.

Otherwise, coverage UE may assume that the subframes listed in MBSFN-SubframeConfigList is not used for any repetition.

SIB Indication on the Number of PRACH Repetition

SIB for coverage enhancement mode UEs can indicate the number of PRACH repetition which UE should perform.

In terms of starting PRACH repetition, it can be associated with SFN such that SFN % m=0 can initiate the PRACH repetition where m is the maximum number of PRACH repetition (or other configured or predetermined number).

A UE transmits the number of repeated PRACH where the number of repetition is per configured repetition number in SIB (applies only to contention-based PRACH).

New SIB2 to Indicate PRACH Configuration:

If a new SIB2 is designed which may or may not be combined with SIB1 content for coverage enhancement mode UEs, the following information may be carried in new SIB2.

As to SRS configuration information, regardless of whether coverage enhancement mode UE transmits SRS or not, in terms of transmitting PRACH bundle, a coverage enhancement mode UE may skip subframes where SRS transmission can be occurred per SRS configuration.

As to PRACH configuration for legacy UEs, if one or more PRACH configuration is given to coverage enhancement mode UEs, it would be also beneficial to indicate the PRACH configuration for legacy UEs. Once coverage enhancement mode UE knows the legacy UE configuration, it can assume that it would not use subframes which can be used for legacy PRACH transmission for PRACH bundle even though it is configured to use those subframes in the new PRACH configurations. In terms of determining the preamble, it is also useful to know the number of preambles used for legacy UEs such that the number of allocated preamble for coverage enhancement mode UEs can start to the next preambles according to root sequence index. For example, if number of preambles used for legacy UEs is 4 and the number of preamble used for coverage enhancement mode UEs is 4, coverage enhancement mode UEs can use preamble index 4-7 using the same root sequence index to legacy UEs. Or, new SIB may carry the starting and the number of preamble indices as well.

As to PDSCH configuration, this may carry the maximum number of PDSCH repetition that system is planning to perform. This may be applied to SIB transmission itself. And the necessary information related to power and RS power also can be signaled. Otherwise, it may be assumed as default values.

As to PDCCH configuration, this also may carry the maximum number of PDCCH repetition that system is planning to perform, in particular for cell-specific data transmissions such as SIB, paging, etc.

Similarly, PUCCH and PUSCH configuration also include necessary information related to PUSCH and PUCCH transmission. If dedicated resource is used for PUCCH for coverage enhancement mode UEs, PUCCH configuration can also include some dedicated PUCCH resources for coverage enhancement mode UEs.

If TPC-RNTI is used differently, new SIB will carry separate TPP-RNTI as well.

A list of subframes which can be used for bundling: a set of subframes (DL and UL or DL/UL separately) which can be used for PDCCH/PDSCH or PUCCH/PUSCH bundle transmission can be also configured.

TPC Command for Coverage Enhancement UEs:

If a coverage enhancement mode UE is configured to monitor TPC commands, a separate RNTI (TPC-CE-PUCCH-RNTI, TPC-CE-PUSCH-RNTI) can be considered where power accumulation or configuration will be occurred only once per bundled TPC command.

Figure 9:
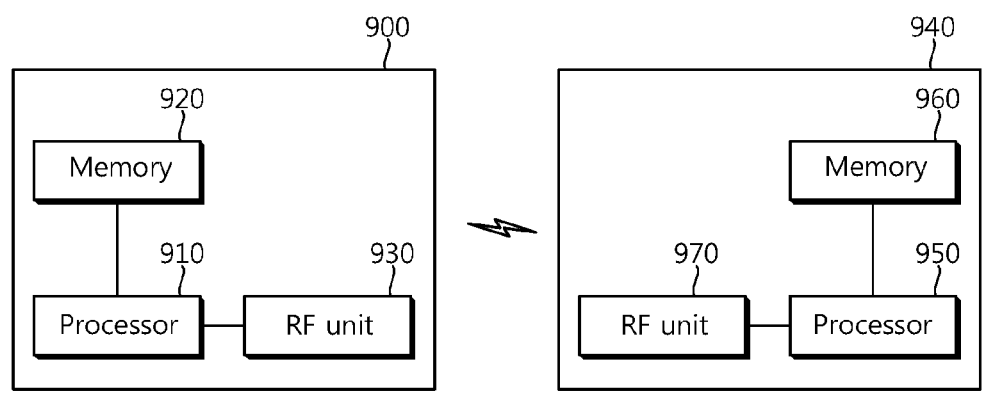
FIG. 9 is a block diagram which briefly describes a wireless communication system.

FIG. 9 is a block diagram which briefly describes a wireless communication system including an UE 900 and a BS 940. The UE 900 and the BS 940 may operate based on the description as explained above.

In view of downlink, a transmitter may be a part of the BS 940 and a receiver may be a part of the UE 900. In view of uplink, a transmitter may be a part of the UE 900 and a receiver may be a part of the BS 940.

Referring to FIG. 9, the UE 900 may include a processor 910, a memory 920 and a radio frequency (RF) unit 930.

The processor 910 may be configured to implement proposed procedures and/or methods described in this application. For example, the processor 910 may perform random access or initial access to the network. During the initial access process, the processor 910 may determine whether the UE 900 needs coverage enhancement or not and may also determine the network support coverage enhancement or not. Further, the processor 910 may determine the level of coverage enhancement level which the UE 900 needs. These processes may be performed in each of the steps of initial processes, for example, the processor 910 may detect a cell with primary synchronization signal (PSS) and/or secondary synchronization signal (SSS), detect reference signal based on the detected synchronization signal, detect broadcasting channel based on the detected reference signal and decoding master information block on the broadcasting channel, detect system information block on a downlink data channel, transmit random access preamble on random access channel based on a system information obtained from the system information block and receive random access response corresponding to the random access preamble. The processor 910 may determine whether coverage enhancement is needed or not based on at least one of the detected signals and system information. The details are described before with FIG. 5.

The processor 910 may also perform transmission power control considering the coverage enhancement circumstances. For example, the processor 910 may perform receiving cell specific reference signal via RF unit 930, estimating path loss based on the cell specific reference signal and determining transmission power based on the estimated path loss. Here, the processor 910 may adjust transmission power based on the number of repeated downlink transmission and threshold transmission power which is required by base station (BS). The threshold transmission power may determined by the processor 910 based on the number of repeated downlink transmission. Or, the threshold transmission power may pre-determined by the BS 940 910 based on the number of repeated downlink transmission. The details are described above.

The memory 920 is coupled with the processor 910 and stores a variety of information to operate the processor 910, which includes data information and/or control information. The RF unit 930 is also coupled with the processor 910. The RF unit 930 may transmit and/or receive a radio signal.

The BS 940 may include a processor 950, a memory 960 and a RF unit 970. Here, the BS may be PCell or SCell and the BS may be a macro cell or small cell.

The processor 950 may be configured to implement proposed procedures and/or methods described in this application. For example, the processor 950 may transmit downlink channel repeatedly for the coverage limited UE and/or may transmit additional signal indicating the network support coverage enhancement. Further, the processor 950 may perform transmission power control for coverage enhancement. The details are same as described above.

The memory 960 is coupled with the processor 950 and stores a variety of information to operate the processor 950, which includes data information and/or control information. The RF unit 970 is also coupled with the processor 950. The RF unit 970 may transmit and/or receive a radio signal.

The UE 900 and/or the BS 940 may have single antenna or multiple antennas. The wireless communication system may be called as multiple input/multiple output (MIMO) system when at least one of the UE 900 and the BS 940 has multiple antennas.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method of initial accessing by an user equipment (UE), the method comprising:
    detecting a cell with primary synchronization signal (PSS) and/or secondary synchronization signal (SSS);
    detecting reference signal based on the detected synchronization signal;
    detecting broadcasting channel based on the detected reference signal and decoding master information block on the broadcasting channel;
    detecting system information block on a downlink data channel; and
    transmitting random access preamble on random access channel based on a system information obtained from the system information block, wherein whether coverage enhancement is needed or not is determined based on at least one of the detected signals and system information, and
    wherein coverage for the UE is enhanced when the coverage enhancement is determined as needed.

2. The method of claim 1, wherein in the step of detecting the cell, the coverage enhancement is determined as needed when the number of the synchronization signals is exceed predetermined number.

3. The method of claim 2, wherein whether the cell supports the coverage enhancement or not is determined according to a cell ID specified by the synchronization signal.

4. The method of claim 1, wherein in the step of detecting the cell, the coverage enhancement is determined as needed for a cell ID specified by the synchronization signal when the strength of the synchronization signals is lower than predetermined threshold.

5. The method of claim 1, wherein in the step of detecting the cell, whether the cell supports the coverage enhancement or not is determined according to a cell ID specified by the synchronization signal.

6. The method of claim 1, wherein in the step of detecting the broadcasting channel, the coverage enhancement is determined as needed when the broadcasting channel needs to be transmitted repeatedly for decoding the master information block.

7. The method of claim 6, wherein a coverage level is determined based on the number of broadcasting channels repeated transmitted, and wherein the coverage level specifies coverage of the UE to be enhanced.

8. The method of claim 1, wherein in the step of detecting system information block, the coverage enhancement is determined as needed when the downlink data channel needs to be transmitted repeatedly for decoding the system information block.

9. The method of claim 8, wherein a coverage level is determined based on the number of downlink data channels repeated transmitted, and wherein the coverage level specifies coverage of the UE to be enhanced.

10. The method of claim 1, wherein the number of repeated downlink transmission is signaled by higher layer or downlink control information (DCI) signaling when the number of repeated downlink transmission is changed for the UE for which coverage needs to be enhanced.

11. The method of claim 1, wherein the number of repeated system information block transmission is signaled by downlink data channel when the number of repeated system information block transmission is changed for the UE for which coverage needs to be enhanced.

12. The method of claim 1, wherein in the step of transmitting random access channel, transmission power is adjusted based on the number of repeated downlink transmission and threshold transmission power which is required by base station (BS), and
wherein the threshold transmission power is determined based on the number of repeated downlink transmission.

13. A method of controlling transmission power by coverage limiting user equipment (UE), the method comprising:
receiving cell specific reference signal;
estimating path loss based on the cell specific reference signal; and
determining transmission power based on the estimated path loss, wherein the transmission power is adjust based on the number of repeated downlink transmission and threshold transmission power which is required by base station (BS), and
wherein the threshold transmission power is determined based on the number of repeated downlink transmission.

* * * * *